Jan. 15, 1946.  H. B. SUHR ET AL  2,392,888
PROCESS OF TREATING SOLUTIONS OF SODIUM CARBONATE AND SODIUM SULPHATE
TO INCREASE THE RATIO OF SODIUM CARBONATE TO SODIUM SULPHATE
Filed Jan. 17, 1942   2 Sheets-Sheet 1

CONCENTRATIONS
AT 25°C.

CONCENTRATIONS
AT 30°C.

Inventors
Henry Bruno Suhr
Elliott Bryant Fitch

By
Attorneys

Jan. 15, 1946.  H. B. SUHR ET AL  2,392,888
PROCESS OF TREATING SOLUTIONS OF SODIUM CARBONATE AND SODIUM SULPHATE
TO INCREASE THE RATIO OF SODIUM CARBONATE TO SODIUM SULPHATE
Filed Jan. 17, 1942  2 Sheets-Sheet 2
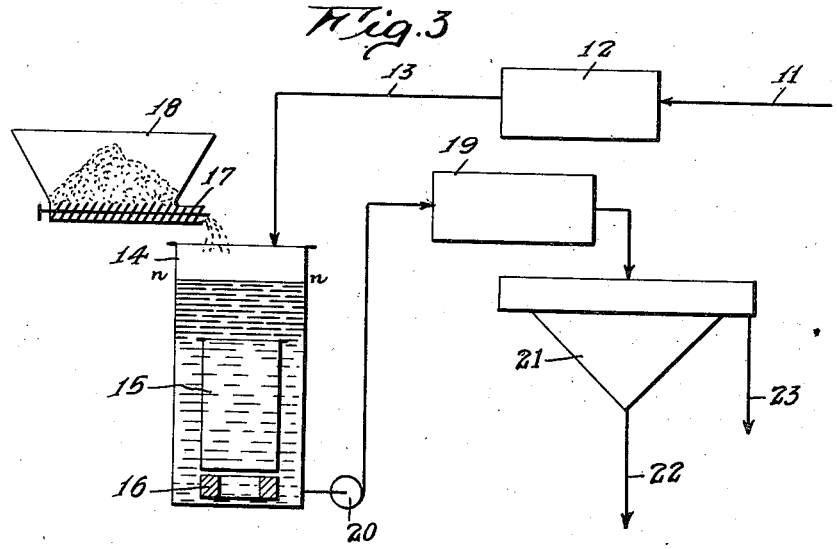
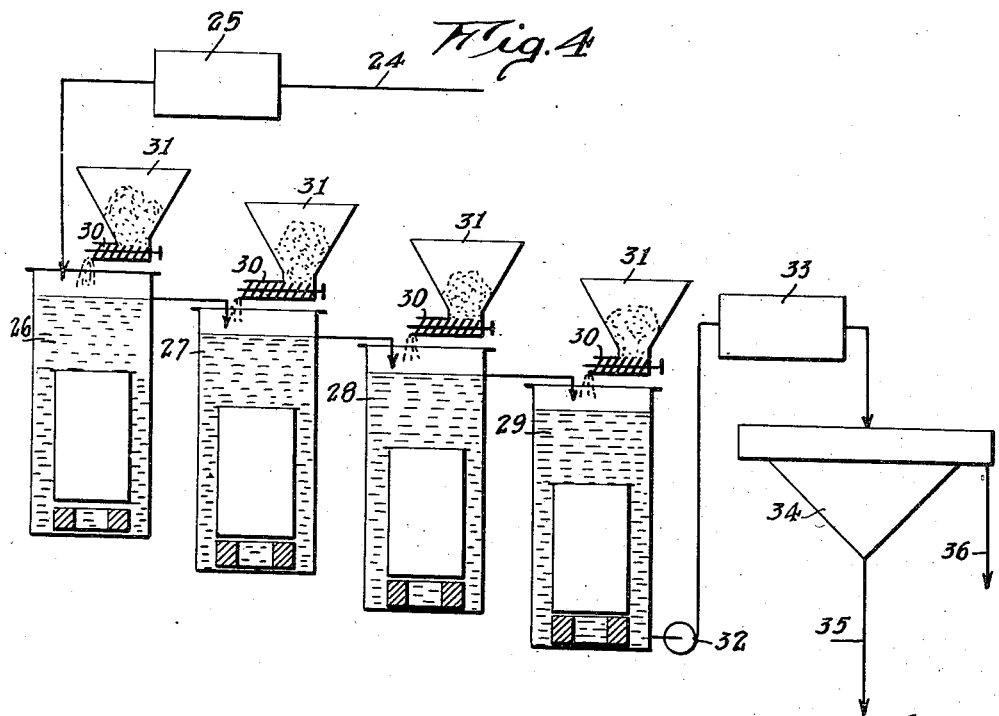
Inventors
Henry Bruno Suhr
Elliott Bryant Fitch
By Lyon Lyon Attorneys Patented Jan. 15, 1946

2,392,888

UNITED STATES PATENT OFFICE 2,392,888

PROCESS OF TREATING SOLUTIONS OF SODIUM CARBONATE AND SODIUM SULPHATE TO INCREASE THE RATIO OF SODIUM CARBONATE TO SODIUM SULPHATE

Henry Bruno Suhr and Elliott Bryant Fitch, Trona, Calif., assignors to American Potash & Chemical Corporation, Trona, Calif., a corporation of Delaware Application January 17, 1942, Serial No. 427,140

8 Claims. (Cl. 23—38)

This invention relates to a process of treating a solution of sodium carbonate and sodium sulphate, which also may contain some chloride or other salt, to increase the ratio of sodium carbonate to sodium sulphate. The invention also relates to a process of precipitating anhydrous sodium sulphate from solutions containing sodium carbonate and sodium sulphate.

Burkeite, a double salt of sodium sulphate and sodium carbonate ($Na_2CO_3.2Na_2SO_4$), is the solid phase which may be in stable equilibrium with many solutions containing sodium carbonate and sodium sulphate. Thus, for example, in United States Patent No. 1,836,426, Figure 1 delineates the varying proportions of sodium carbonate and sodium sulphate at which burkeite may be in stable equilibrium at various temperatures with solutions containing sodium carbonate and sodium sulphate and free of sodium chloride. Figure 2 of the same patent delineates the varying proportions of sodium carbonate and sodium sulphate and the various temperatures at which burkeite is in stable equilibrium with solutions containing sodium carbonate and sodium sulphate and saturated with respect to sodium chloride.

Sodium chloride has a marked effect upon the solubility of burkeite, as will be noted by comparison of the two aforesaid polytherms. Between the extremes depicted by the aforesaid two polytherms there exists an infinite number of systems in which burkeite is a stable phase—ranging from solutions containing little or no sodium chloride concentration to solutions saturated with respect to sodium chloride. Any manipulation of a solution directed towards crystallization of a solid phase from a solution in which manipulation is carried out with the solution having a composition and temperature such that burkeite is the solid phase in stable equilibrium with the solution should result normally in burkeite being the solid phase so crystallized from such a solution, and heretofore burkeite has, in fact, been the solid phase so crystallized from such solutions as described, for example, in U. S. Patents Nos. 1,836,426, 1,853,275 and 1,824,360. The precipitation of burkeite from solutions containing sodium carbonate and sodium sulphate has been used in large scale commercial operations for the purpose of lowering the sodium sulphate concentration of such solutions and preparing such solutions for the recovery of the sodium carbonate content thereof. Thus, for example, in the process of U. S. Patent No. 1,836,426 precipitation of burkeite from a solution termed "cold sulphate liquor" is caused to take place by the addition of sodium chloride to the liquor. Such precipitation of burkeite so lowers the sodium sulphate content of the liquor and so increases the ratio of sodium carbonate to sodium sulphate in the liquor that the recovery of pure sodium carbonate, as sal soda ($Na_2CO_3.10H_2O$), from the liquor is made possible in subsequent steps. However, the burkeite so precipitated is of little commercial value—it simply becomes a raw material in the process of that patent. In the past, it has been considered that burkeite was the only sodium sulphate containing phase which could be caused to precipitate from such solutions. We have discovered, however, that in place of precipitating burkeite such solutions may be manipulated to precipitate anhydrous sodium sulphate. Sodium sulphate is a valuable commercial product. Moreover, the precipitation of anhydrous sodium sulphate from such solutions (in place of precipitating burkeite) produces solutions containing even a higher ratio of sodium carbonate to sodium sulphate and is better adapted for the subsequent recovery of sodium carbonate than the solutions which can be produced by the previous processes relying on the precipitation of burkeite.

The process of this invention should not be confused with various well-known processes in which a precipitation of anhydrous sodium sulphate is obtained from solutions having compositions such that anhydrous sodium sulphate is in stable equilibrium with the solution being manipulated. Such processes are not applicable to the precipitation of anhydrous sodium sulphate from solutions having compositions such that burkeite is the solid phase in stable equilibrium with the solution, and such methods would, in fact, if applied to the solutions of the process of the present invention, cause precipitation of burkeite from such solutions rather than anhydrous sodium sulphate.

We have discovered that when solutions of sodium carbonate and sodium sulphate, having compositions such that burkeite is the solid phase which may be in a stable equilibrium with such solutions, are treated with sodium chloride to render such solutions supersaturated with respect to burkeite and so manipulated as to retain such solutions suitably supersaturated with burkeite they may be caused to precipitate anhydrous sodium sulphate in place of burkeite, the anhydrous sodium sulphate so precipitated from the solutions being an unstable or a metastable precipitation.

The process of the present invention, together with further objects and advantages of the invention, will be more fully understood from the following description of the preferred form or forms of the process. For this purpose, we have hereinafter described our preferred process in connection with the accompanying drawings, in which:

Figure 3 is a diagrammatic illustration of a suitable form of apparatus for performing a batch process.

Figure 4 is a diagrammatic illustration of a suitable form of process for conducting a continuous process.

Figure 1:
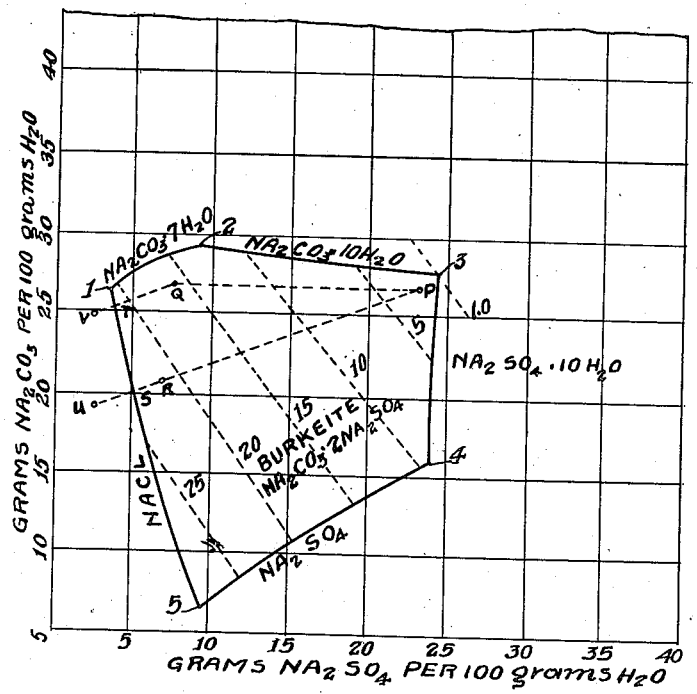
Figure 1 represents an isotherm at 25° C. showing the solubility of and the limits of the fields of stability of burkeite in solutions containing sodium carbonate and sodium sulphate with varying quantities of sodium chloride.
Figure 2:
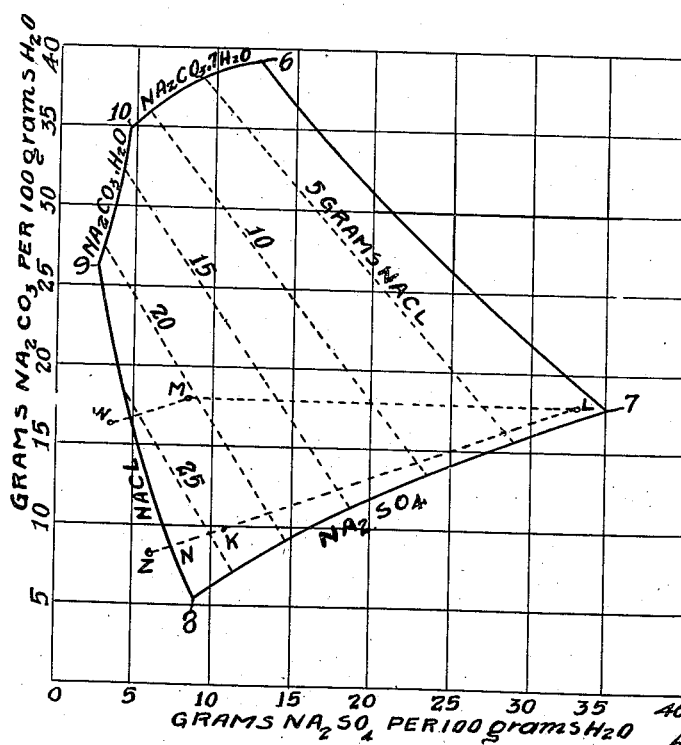
Figure 2 is a similar isotherm at 30° C.

Figures 1 and 2 of the drawings represent an isotherm in the system $Na_2CO_3$—$Na_2SO_4$—$NaCl$, being plane diagrams with the axes chosen to show $Na_2SO_4$ and $Na_2CO_3$ concentrations in terms of grams per 100 grams of water. The numerical values for the quantity of NaCl in solution can not, of course, be plotted on a plane diagram; instead, "contours" of equal NaCl concentrations have been superimposed on the field of stability of burkeite. Such contours might be termed "isochlors."

In Figure 1 a solution, having the composition represented by point 1, is an isothermally invariant solution and is saturated with respect to NaCl, burkeite, and $Na_2CO_3.7H_2O$. The NaCl concentration at that invariant point is fixed and has been found to be 20.9 grams NaCl per 100 grams $H_2O$. A solution having the composition represented by point 5 is likewise an isothermally invariant solution, being saturated with sodium chloride, burkeite, and sodium sulphate. The NaCl concentration again is not subject to any external fixation, but is determined by the system itself and the temperature, and is found to be 29.0 grams of NaCl per 100 grams $H_2O$. All solutions having compositions lying along the line 1—5 are saturated with NaCl and are also saturated with burkeite.

Point 3 of Figure 1 represents a solution containing about 1.0 gram of NaCl per 100 grams of water. The solution at this point is saturated with respect to burkeite, sal soda, and glauber salt at 25° C. This point, likewise, is isothermally invariant. If there were less than the specified 1.0 gram NaCl, burkeite would no longer be stable at this temperature. Point 4 contains 9.4 grams NaCl per 100 grams $H_2O$ and is saturated with burkeite, $Na_2SO_4$, and glauber salt. If there were less NaCl present, $Na_2SO_4$ would cease to exist at that temperature.

The line 1—2—3 represents another boundary of the field of stability of burkeite, the NaCl concentration varying from 20.9 grams per 100 grams $H_2O$ at point 1 to 1.0 gram NaCl per 100 grams $H_2O$ at point 3. Intermediate NaCl concentrations along the line 1—2—3 may, of course, be determined from the isochlor lines.

All points within the enclosed area 1—2—3—4—5 of Figure 1 represent the sodium carbonate and sodium sulphate concentrations of solutions in equilibrium with burkeite. The sodium chloride concentrations of these solutions, which vary from low values in the neighborhood of point 3 to high (saturation) values along curve 1—5, are shown by the aforementioned isochlors. The boundary lines of the area represent solutions which are in equilibrium with burkeite and one additional solid phase. Thus, lines or curves 1—2, 2—3, 3—4, 4—5, and 5—1 represent solutions in equilibrium with burkeite and respectively with $Na_2CO_3.7H_2O$, $Na_2CO_3.10H_2O$, $Na_2SO_4.10H_2O$, $Na_2SO_4$, and NaCl, as indicated by the legends on the drawings. While burkeite is stable in contact with solutions represented by all points along the curves and within the enclosed area, burkeite is unstable at this temperature (25° C.) in contact with solutions represented by points outside the area. This enclosed area will consequently be designated hereinafter as the burkeite field of stability at the specified temperature.

In Figure 2 of the drawings, the area 6—7—8—9—10 defines the burkeite field of stability at 30° C. In this case, the curve 6—7 represents the composition of solutions in equilibrium with burkeite when no sodium chloride is present—a condition which is possible at this higher temperature. Curves 7—8, 8—9, 9—10, and 10—6 represent solutions in equilibrium with burkeite and also, respectively, with $Na_2SO_4$, NaCl, $Na_2CO_3.H_2O$, and $Na_2CO_3.7H_2O$. The superimposed isochlors show the NaCl concentrations over this 30° C. burkeite field of stability.

It is the manipulation of solutions having compositions within the burkeite field of stability, as represented by the closed field 1—2—3—4—5 of Figure 1 and the enclosed area 6—7—8—9—10 of Figure 2 to crystallize therefrom anhydrous sodium sulphate which constitutes an essential feature of the process of the present invention. The manipulations of solutions having compositions within such burkeite fields of stability to crystallize therefrom a sodium sulphate containing salt have heretofore always resulted in the crystallization of burkeite.

A useful example of the process of the present invention is the manipulation of a liquor called "cold sulphate liquor" in U. S. Patent No. 1,836,426. In U. S. Patent No. 1,836,426 burkeite is caused to precipitate from said liquor by heating and adding sodium chloride. Point P in Figure 1 of the present drawings represents a typical (practical) composition of a "cold sulphate liquor," 1000 pounds of which contain 179 pounds of sodium carbonate, 154 pounds of sodium sulphate, 667 pounds of water, and only a little sodium chloride. In accordance with past practices directed to precipitating burkeite from such a solution, sodium chloride—for example 138 pounds—was added to the liquor having the composition represented by the point P and burkeite precipitated, the composition of the solution moving along the broken line PR and finally resting at R upon the completion of the "reaction." By adding sufficient sodium chloride to saturate the liquor, the composition of the liquor could be made to correspond to the composition of the point marked S on Figure 1. Heating to 50° C. while maintaining saturation with respect to sodium chloride may accomplish a little more precipitation of burkeite yielding liquor having a composition as represented by the point U in Figure 1.

In the process of the present invention we may add 138 pounds of sodium chloride to the 1,000 pounds of the above liquor P at 25° C. and precipitate metastably 103 pounds of substantially pure anhydrous sodium sulphate. This process is represented in Figure 1 by the broken line from P to Q.

In order to successfully carry out the metastable precipitation of anhydrous sodium sulphate, as described in the above example, it has been found that strict control of certain conditions of the precipitation is essential. It is especially important that the reagent, sodium chloride, be added to the liquor slowly or in small increments. When conducting the process employing a liquor of the composition represented by point P in Figure 1, rates approximating 0.05 pound of sodium chloride may be added per minute per gallon of solution in process. However, said rates are about the maximum which can be employed, and these may cause difficulties unless other factors are especially favorable to the process. For steady trouble-free operation, we prefer to conduct the process with a sodium chloride addition rate not exceeding about 0.015 pound per minute per gallon of solution in process. It is understood, of course, that vigorous agitation is employed so that the added sodium chloride is immediately mixed with the bulk of the solution, thus preventing any localized concentration of sodium chloride. The supposed explanation for the necessity of thus slowly adding the sodium chloride is that by such a procedure the solutions are never caused to be greatly supersaturated with respect to burkeite, with the consequent effect that no great tendency exists for the burkeite to precipitate as would be the case if a large amount of sodium chloride were caused to be dissolved at once. The tendency for anhydrous sodium sulphate to precipitate in but slightly supersaturated solutions appears to be greater than the like tendency for burkeite. Moreover, as a result of the metastable precipitation of anhydrous sodium sulphate, the degree of burkeite supersaturation of the solutions never becomes excessive, unless the sodium chloride concentration is caused to increase too rapidly.

The addition of sodium chloride and the metastable precipitation of anhydrous sodium sulphate may be carried out as a batch process or as a continuous process. We prefer the continuous process.

In Figure 3 of the drawings, we have illustrated one form of a suitable apparatus for conducting the process in a batch type of treatment.

11 represent a source of the solution to be treated. Heat interchanger 12 is for the purpose of adjusting, when necessary, the temperature of the solution, which is then added through line 13 to agitated tank 14. In the preferred form, tank 14 consists of a cylindrical shell containing an agitating system comprising an internal circulating well 15 and an impeller 16 of the type described in U. S. Patent No. 1,997,277. This tank is filled to some convention level $n-n$, whereupon the addition of solution is stopped. Sodium chloride is then fed into the tank containing the solution at a slow controlled rate through feed screw 17 from a sodium chloride storage hopper 18 until the solution has dissolved essentially all the sodium chloride possible under the conditions of our new process. At this time the addition of sodium chloride is stopped, and soon thereafter the contents of tank 14 are withdrawn through heater 19 by pump 20 to settler 21. Heater 19 is necessary only if the conditions of operation cause the precipitation of a hydrated phase of sodium carbonate and the heating therein obtained serves mainly to redissolve any such precipitated sodium carbonate phase, although it also tends somewhat to reduce the solubility of anhydrous sodium sulphate in the liquor. The sodium sulphate, which had been caused to precipitate in the operation, is withdrawn as a thickened slurry from the settler underflow at 22 for subsequent treatment, which may consist of "de-watering" and drying. The liquid phase, consisting of the filtrate from the de-watering operation, together with the clear liquor obtained in the settling and decanting operations, is withdrawn from line 23 and may then be treated for recovery of the sodium carbonate therein contained.

The preferred continuous form of the process of our invention is illustrated in Figure 4. Here 24 represents a source of solution to be treated and 25 a heat interchanger for adjusting its temperature when necessary. The solution is caused to flow through a plurality of agitated tanks in series, as for example through the four agitated tanks, 26, 27, 28, and 29 illustrated in Figure 4. The agitation in each of these tanks is preferably provided by means of an internal circulating well and impeller of the general type described in U. S. Patent No. 1,997,277. To the liquor in each of these tanks is continuously added a small controlled flow of fine granular sodium chloride through the feed screws 30 from the sodium chloride hoppers 31. The total addition of sodium chloride at the tanks is regulated so that the liquid phase discharging from the final tank is essentially saturated with sodium chloride under the conditions of our process. Material is pumped continuously from tank 29 by pump 32 through heater 33, if necessary to redissolve any hydrated solid phase of sodium carbonate and into settler 34. The underflow slurry obtained at 35 from settler 34 contains the solid sodium sulphate precipitated by the operation. This may be treated as previously mentioned in connection with Figure 3 while the remaining liquid phase overflowing the settler is withdrawn at 36 for subsequent treatment for the recovery of sodium carbonate, if desired.

A full-scale application of this invention has been practiced, conducted in equipment arranged as in Figure 4 of the drawings. Four precipitation tanks, 26, 27, 28 and 29 contained 25,000 gallons of liquor in process. Sodium chloride was fed in about equal amounts from the four feeders, 30, at a combined rate of 373 pounds per minute. This was equivalent to the addition of 0.0149 pound of NaCl per minute per gallon of solution being processed. Said amount of NaCl was, as explained above, sufficient so that liquid phase discharging from the final tank was essentially saturated with sodium chloride under the conditions of our process. Incidentally, the input flow (which is approximately equal to the output) amounted in this case to about 250 gallons per minute being fed to the first tank, 26.

An important point of control of the process, both in connection with the batch operation and the continuous operation, is that the temperature of the solution or sludge during precipitation should be held near the intended operating temperature. Thus, in the example mentioned for the processes to be operated at 25° C. the temperature normally should not be allowed to exceed about 28° C. As discussed more fully below, the maximum permissible temperature is an inverse function of the quantity of sodium carbonate present in the liquor. In general, a slower effective rate of addition of sodium chloride permits a higher temperature of operation up to a maximum of about 28° C. However, we prefer to maintain the temperature of the digesting sludges in a range between 22° C. and 25° C.

when dealing with solutions of high sodium carbonate content, as used in the example specified.

It is preferred that the sodium chloride employed as a reagent in this metastable precipitation should be fairly pure, especially as regards the presence of burkeite as a contaminant. Obviously, any burkeite present in the reagent sodium chloride will not dissolve in the liquor being treated, but will remain as an impurity with the metastably precipitated anhydrous sodium sulphate. The presence of too much burkeite in the reagent sodium chloride has been found, at times, to act as seed for the encouragement of the undesired (but stable) precipitation of burkeite from the solution. In certain instances, due to the presence of excessive quantities of burkeite seed, we have found both stable burkeite and metastable anhydrous sodium sulphate to precipitate simultaneously. If burkeite as an impurity in the anhydrous sodium sulphate is not rejected by the consumer, then such impure (burkeite-containing) sodium chloride may be employed as a reagent in this process. However, contaminated products are seldom desired, and we therefore prefer reagent sodium chloride containing from zero per cent up to not more than about 5 per cent of solid burkeite as an impurity. Such sodium chloride might be termed "commercially pure."

In certain of our work on solutions of high carbonate content, the requisite low temperature of manipulation, say 22° C., has resulted in a simultaneous precipitation of some hydrated sodium carbonate ($Na_2CO_3 \cdot 7H_2O$). This is of little consequence, however, as we have found that the metastable precipitation of anhydrous sodium sulphate may be carried out as directed, at the low temperature, followed by a slight but gentle warming of the sludge. Such gentle warming, say from 22° C. to 25° C. serves to re-dissolve the discrete solid phase of hydrated sodium carbonate ($Na_2CO_3 \cdot 7H_2O$) precipitated at the lower temperature, leaving as a solid phase the essentially pure $Na_2SO_4$ precipitated by the process of our invention.

As a final precaution, the anhydrous sodium sulphate should be separated from the solution as soon as possible in order that time be not allowed for the re-establishment of equilibrium conditions, that is, for conversion of the precipitated metastable anhydrous sodium sulphate into burkeite. The solid product may be filtered, settled out, or otherwise separated from the liquor by means of the usual equipment for these purposes.

While 28° C. is the maximum temperature at which anhydrous sodium sulphate can be precipitated from the solution of the composition used in the foregoing example, we have found that higher temperatures are permissible when the solutions have lower sodium carbonate concentrations. Thus, metastable precipitation of anhydrous sodium sulphate has been accomplished within the burkeite field at higher temperatures, say from 30° C. to 50° C., by controlled addition of sodium chloride to solutions having compositions within the burkeite field of stability but with lower sodium carbonate concentrations.

An example of the form of this invention in which anhydrous sodium sulphate is precipitated from solutions having compositions within the burkeite field of stability but with relatively low sodium carbonate concentrations is illustrated in Figure 2 of the drawings. Point L within the burkeite field of stability at 30° C. represents the composition of a solution formed by the manipulation of a burkeite complex with water. When 163 pounds of sodium chloride is added to 1000 pounds of the above liquor at 30° C. and in accordance with the conditions set forth in the preceding example, 164 pounds of anhydrous sodium sulphate precipitate metastably. The solution composition travels from point L to point M. Under prior teachings, on the other hand, if burkeite were caused to be precipitated by addition of sodium chloride to a solution of composition represented by point L, the solution composition would travel to some point K along the line LN and would ultimately reach point N when the solution became fully saturated with sodium chloride.

In the foregoing examples, the quantities of sodium chloride added in a controlled manner (to cause the metastable precipitation of anhydrous sodium sulphate in defiance of the established burkeite fields) was in both cases the maximum quantity which could be dissolved under those respective conditions. Use of such maximum quantities insures a maximum yield of anhydrous sodium sulfate, but it is not requisite that such maximum quantities be used. In fact, in practical operation of the process, we prefer to fall somewhat short of such maximum usage. It will be noted that the sodium chloride "isochlors" already established for the stable burkeite system do not apply to the solubility characteristics of this newly discovered metastable system involved in our invention. In order to enable one skilled in the art to determine the maximum quantity of sodium chloride which may be dissolved while precipitating anhydrous sodium sulphate instead of burkeite, we offer the following listing:

| $Na_2CO_3$ content of the liquor, within the burkeite field | Maximum quantity of $NaCl$ which will dissolve, while metastably precipitating $Na_2SO_4$ |
|---|---|
| 25° C. | |
| 14.0 gm./100 gm. $H_2O$ | 25.8 gm./100 gm. $H_2O$ |
| 18.0 gm./100 gm. $H_2O$ | 24.1 gm./100 gm. $H_2O$ |
| 22.0 gm./100 gm. $H_2O$ | 22.5 gm./100 gm. $H_2O$ |
| 26.0 gm./100 gm. $H_2O$ | 20.9 gm./100 gm. $H_2O$ |
| 30° C. | |
| 7.0 gm./100 gm. $H_2O$ | 29.3 gm./100 gm. $H_2O$ |
| 11.0 gm./100 gm. $H_2O$ | 27.6 gm./100 gm. $H_2O$ |
| 15.0 gm./100 gm. $H_2O$ | 25.9 gm./100 gm. $H_2O$ |
| 19.0 gm./100 gm. $H_2O$ | 24.2 gm./100 gm. $H_2O$ |

We have found it desirable to have present in the solution during this novel sodium sulphate precipitation process a quantity of $Na_2SO_4$ "seed." This is especially true at the start of the precipitation of anhydrous sodium sulphate instead of the stable salt, burkeite. Such seed may be added to the liquor, such as P of Figure 1, before or during the first addition of sodium chloride. We have found both anhydrous sodium sulphate and the hydrated form, glauber salt, of value to this end.

Heretofore, we have referred to the processes of U. S. Patents Nos. 1,853,275 and 1,824,360, which processes add sodium chloride to liquors such as P of Figure 1 for the precipitation of burkeite. In prior practice, the object of such manipulation was not to obtain a marketable product, but chiefly to rid the liquors of some of the dissolved sodium sulphate—by dragging down such sodium sulphate as the double salt burkeite, $Na_2CO_3.2Na_2SO_4$. Precipitation of burkeite removed, of course, considerable $Na_2CO_3$ along with the $Na_2SO_4$, and since the chief object of the maneuver was to prepare a liquor having a high $Na_2CO_3$ content (and a simultaneous low $Na_2SO_4$ content) such a process defeated its own end to some extent.

Many of the finished carbonate liquors produced by the process of the present invention are superior to the carbonate liquors of such prior practice. Stated otherwise, our process is more effective for increasing the ratio of sodium carbonate to sodium sulphate than prior art practice. For example, the liquor M (Figure 2) containing 18.0 grams $Na_2CO_3$ per 100 grams of water (and 8.2 grams $Na_2SO_4$) is, without question, superior to liquor N containing only 8.4 grams $Na_2CO_3$ per 100 grams water (and 7.5 grams $Na_2SO_4$). While the comparison is favorable to the liquor M of the present process, such comparison is not quite valid, as either liquor would be heated further and brought to saturation with respect to sodium chloride at the higher temperature. In other words, the complete process of the present application contemplates heating the liquor M (from which a crop of anhydrous sodium sulphate has been metastably precipitated and removed at 30° C.) to 50° C. or higher, up to the boiling point. Sufficient sodium chloride is caused to be present at the elevated temperature to bring the hot carbonate liquor to, or close to, saturation with respect to NaCl.

After removing the crop of anhydrous sodium sulphate from our liquor M (or a similar liquor Q) we then proceed to heat the liquor to 50° C., or higher. If said heating is done by the direct admission of steam (as is often done commercially), then further quantities of NaCl must be added to compensate the dilution effect. Upon such treatment no further precipitation of anhydrous sodium sulphate will take place, but rather the stable solid phase, burkeite, will precipitate. Such manipulation at 50° C. will cause the composition of the solution M (from which the crop of anhydrous sodium sulphate was removed at 30° C.) to move from M on the 30° C. diagram (Figure 2) to a new point, designated as W, outside the 30° C. diagram. Such a point is, of course, a part of another isothermal stability field of burkeite; the "point-composition" of the 50° C. hot carbonate liquor so produced being superimposed on Figure 2. In conducting this second precipitation step, only a very small crop of burkeite can be thrown down. To prevent lag in such burkeite precipitation, we find it desirable, at times, to assist the precipitation by adding solid burkeite to the hot liquor. Agitation of the hot solution likewise assists in the complete precipitation of the burkeite.

Thus, by the improved process of this invention, a liquor of composition L (Figure 2) lying within the burkeite field is first treated in the neighborhood of 30° C. with NaCl so as to metastably precipitate anhydrous sodium sulphate, thus removing the greater portion of the sulphate content of such liquor without diminishing the carbonate content, followed by a finishing treatment at 50° C. or above for final reduction of the sulphate content. According to prior practice, liquor L of Figure 2 would have, upon such treatment, followed the path L to Z, precipitating only burkeite. It is obvious that liquor W of the present process is vastly superior (as a "hot carbonate liquor" from which sal soda may be recovered by cooling) to the liquor Z of past practice. In fact, the latter liquor would be practically worthless.

Similar advantage is seen in the instance of the hot carbonate liquors resulting from the new process treatment of high carbonate starting liquors, such as P of Figure 1. After metastably precipitating (and removing) anhydrous sodium sulphate at about 25° C., thereby producing liquor Q, we then heat the liquor to 50° C., or higher; little or no more NaCl need be added in this instance. Under these conditions the stable phase, burkeite, precipitates, yielding a liquor of composition V. According to prior practice (which has heretofore been used for the production of thousands of tons of soda products), the liquor P was saturated with NaCl at 50° C., precipitating burkeite and producing a liquor, such as U. The improved liquor V of this new process is a vastly superior hot carbonate liquor, as compared with the old-style hot carbonate liquor U.

After removing the small crop of burkeite which is precipitated when liquor Q (or M) is heated to 50° C. or higher (and rendered saturated or nearly saturated with respect to sodium chloride), the resulting hot carbonate liquor may be cooled for the recovery of its carbonate values, as sal soda; or it may be utilized in any of a number of other processes wherein a solution high in carbonate (and chloride) and low in sulphate may be of value. In certain instances, the hot carbonate liquor may be passed to other suitable processes without troubling to first remove the precipitated burkeite.

As an example of the advantage of the present process, let us compare the sodium carbonate recoverable from 1,000 pounds of the new hot carbonate liquor V with the prior art hot carbonate liquor U. The yield from the new liquor, when treated in a commercial process now in operation, which treatment comprised cooling to about 0° C., would be 137 pounds of $Na_2CO_3$ (as technically pure sal soda), while the same amount of prior art liquor U would yield only 92 pounds of $Na_2CO_3$ in similar form.

We claim:

1. A process of treating solutions of sodium carbonate and sodium sulphate, of such concentrations and such temperatures that such solutions are included in the field of burkeite stability, to increase the ratio of sodium carbonate to sodium sulfate therein, which comprises seeding such solutions with anhydrous sodium sulphate, adding sodium chloride to such solutions at temperatures below 50° C. at a rate sufficiently slow that approximately pure anhydrous sodium sulphate is precipitated and crystallization of burkeite is substantially prevented, and removing the sodium sulphate thus produced from the solution while in its approximately pure state before reversion to burkeite occurs.

2. A process of treating solutions of sodium carbonate and sodium sulphate, of such concentrations and at such temperatures that such solutions are included in the field of burkeite stability, to increase the ratio of sodium carbonate to sodium sulphate therein, which comprises seeding such solutions with anhydrous sodium sulphate, adding commercially pure sodium chloride to such solutions at temperatures below 50° C. at a rate sufficiently slow that approximately pure anhydrous sodium sulphate is precipitated, and crystallization of burkeite in more than inconsequential amounts is prevented, and removing the sodium sulphate thus produced from the solution while in its approximately pure state before reversion to burkeite occurs.

3. A process of treating solutions of sodium carbonate and sodium sulphate, of such concentrations and at such temperatures that such solutions are included in the field of burkeite stability, to increase the ratio of sodium carbonate to sodium sulphate therein, which comprises seeding such solutions with anhydrous sodium sulphate, adding sodium chloride at temperatures below 50° C., in quantities less than sufficient to saturate such solution, to such a solution at a rate sufficiently slow that approximately pure anhydrous sodium sulphate is precipitated and crystallization of burkeite in more than inconsequential amounts is prevented, and removing the sodium sulphate which is produced from the solution while in its approximately pure state before reversion to burkeite occurs.

4. A process of treating solutions of sodium carbonate and sodium sulphate, of such concentrations and at such temperatures that said solutions are included in the field of burkeite stability, to increase the ratio of sodium carbonate to sodium sulphate therein, which comprises seeding such solutions with anhydrous sodium sulphate, adding sodium chloride to such solutions at temperatures below 50° C. at a rate sufficiently slow that approximately pure anhydrous sodium sulphate is precipitated, and crystallization of burkeite in more than inconsequential amounts is prevented, slowly increasing the temperature of said solution, and removing the sodium sulphate thus produced from the solution while in its approximately pure state before reversion to burkeite occurs.

5. A process of treating solutions of sodium carbonate and sodium sulphate, of such concentrations and at such temperatures that said solutions are included in the field of burkeite stability, to increase the ratio of sodium carbonate to sodium sulphate therein, which comprises seeding such solutions with anhydrous sodium sulphate, adding sodium chloride to said solution at a temperature below 50° C. and at a rate sufficiently slow that approximately pure anhydrous sodium sulphate is precipitated, and crystallization of burkeite in more than inconsequential amounts is prevented, and removing the sodium sulphate thus produced from the solution while in its approximately pure state before reversion to burkeite occurs.

6. A process of treating solutions of sodium carbonate and sodium sulphate, of such concentrations and at such temperatures that said solutions are included in the field of burkeite stability, to increase the ratio of sodium carbonate to sodium sulphate therein, which comprises seeding such solutions with anhydrous sodium sulphate, adding sodium chloride to said solution at a temperature between 22° C. and 28° C. and at a rate sufficiently slow that approximately pure anhydrous sodium sulphate is precipitated, and crystallization of burkeite in more than inconsequential amounts is prevented, and removing the sodium sulphate thus produced from the solution while in its approximately pure state before reversion to burkeite occurs.

7. A process of treating solutions of sodium carbonate and sodium sulphate, of such concentrations and such temperatures that said solutions are included in the field of burkeite stability, to increase the ratio of sodium carbonate to sodium sulphate therein, which comprises seeding such solutions with anhydrous sodium sulphate, adding sodium chloride to said solution at a temperature below 50° C. and at a rate sufficiently slow that approximately pure anhydrous sodium sulphate is precipitated, and crystallization of burkeite in more than inconsequential amounts is prevented, removing the sodium sulphate thus produced from the solution while in its approximately pure state before reversion to burkeite occurs, and heating the solutions to temperatures above 50° C. while maintaining the solution close to saturation with respect to sodium chloride and precipitating burkeite.

8. A process of treating solutions of sodium carbonate and sodium sulphate, of such concentrations and at such temperatures that said solutions are included in the field of burkeite stability, to increase the ratio of sodium carbonate to sodium sulphate therein, which comprises seeding such solutions with anhydrous sodium sulphate, adding sodium chloride to such a solution at temperatures between 22° C. and 28° C. and at a rate sufficiently slow that approximately pure anhydrous sodium sulphate is precipitated, and crystallization of burkeite in more than inconsequential amounts is prevented, removing the sodium sulphate thus produced from the solution while in its approximately pure state before reversion to burkeite occurs, and heating the solutions to temperatures above 50° C. while maintaining the solutions close to saturation with respect to sodium chloride and precipitating burkeite.

HENRY BRUNO SUHR.
ELLIOTT BRYANT FITCH.